May 10, 1932.  H. O. C. ISENBERG  1,857,308
CATALYTIC APPARATUS
Filed April 29, 1926
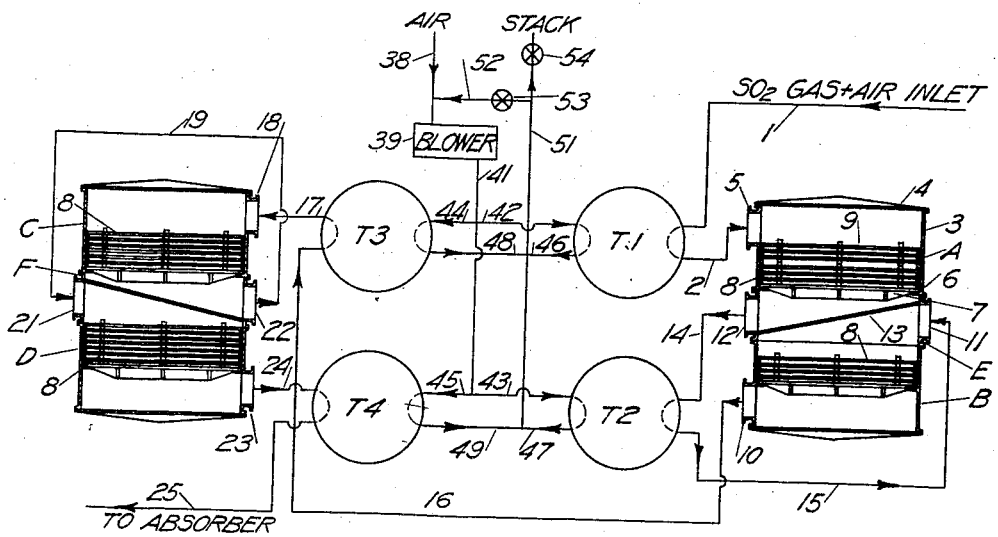
FIG I
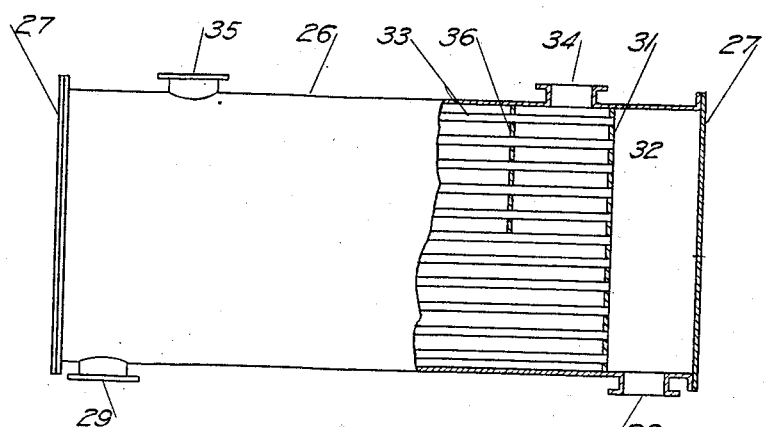
FIG II
INVENTOR
HANS O. C. ISENBERG
BY Forbes Lilaby
ATTORNEY Patented May 10, 1932

1,857,308

UNITED STATES PATENT OFFICE

HANS O. C. ISENBERG, OF NEW ROCHELLE, NEW YORK, ASSIGNOR TO GENERAL CHEMICAL COMPANY, OF NEW YORK, N. Y., A CORPORATION OF NEW YORK

CATALYTIC APPARATUS

Application filed April 29, 1926. Serial No. 105,348.

This invention relates to apparatus of the type used for carrying out the conversion of sulfur dioxide to sulfur trioxide by catalytic oxidation in the contact process for the manufacture of sulfuric acid. The invention has for its chief object the provision of an improved system for conducting the above reaction, characterized chiefly by marked economies in cost of construction and maintenance as compared with the present known systems, and furthermore by increased simplicity in operation and increased yield of product.

In the contact process for the manufacture of sulfuric acid, as is well known, gases containing sulfur dioxide and oxygen are passed in contact with a catalyst, of which various forms of platinum have been found to be the most efficient for this purpose. The two chief essentials to obtain a satisfactory degree of conversion of the sulfur dioxide to sulfur trioxide are careful temperature control of the gases throughout the progress of the reaction, and maintenance of the catalytic material free from contamination by impurities which lessen its activity as a catalyst, and in addition gradually increase the resistance to gas flow therethrough. As the reaction

$$2SO_2 + O_2 \rightarrow 2SO_3$$

is highly exothermic, and as the activity of the catalyst varies greatly with the temperature, it becomes exceedingly difficult to maintain temperature conditions such as to give maximum conversion, necessitating the employment of heat transferrers, capable of withstanding the high temperature conditions and the corrosive action of the gases without the introduction of scale and other impurities into the gases undergoing treatment. As any impurities introduced into the gases in the cooling stages will pass into the following converter stage and contaminate the catalyst, it is essential that the heat transferrers be maintained at all times in good repair. This in the past has been a tedious and time-consuming operation.

Equally of importance with temperature control is the necessity for maintaining in the system a catalyst free from contamination. This is accomplished by providing a removable filter in the first or "A" converter vessel immediately preceding the catalyst, and by so designing the entire system that this filter may be easily and quickly replaced, when it becomes clogged, and in addition that the catalytic material in any of the converter stages may be quickly removed and replaced if this should become necessary. The acid production of the entire plant is directly proportional to the amount of sulfur trioxide produced in the converter system. It will be seen therefore that it is not only necessary to maintain the catalyst at its highest degree of activity, but also to reduce the time of inactivity of the converter system during replacements to a minimum. It is to provide a system capable of close temperature regulation and permitting quick replacement and repair of those parts thereof subject to corrosion, and of the filtering material, that my invention has been designed.

I have illustrated a preferred embodiment of the invention in the accompanying drawings in which:

Fig. I is a diagrammatic view of the arrangement of the system showing a sectional elevation view of the converters.

Fig. II is a plan view partly in section of the heat transferrers diagrammatically shown in Fig. I.

The sulfur dioxide gas mixture from the burners or purification system, comprising mainly sulfur dioxide, oxygen and nitrogen, enters the first heat transferrer $T^1$ through the conduit 1. When operating in accordance with the process disclosed in the patent to Merriam, 1,384,566, for which this system is particularly adapted, these gases will be at a temperature considerably above that at which most efficient conversion takes place, i. e., about 400° C. In their passage through the heat transferrer they are accordingly cooled down to this temperature and then pass into the first converter A through the conduit 2. The converters A, B, C and D are of substantially the same construction and comprise a tubular casting 3 forming an outer shell and provided with a removable top 4 and an inlet 5. The shell 3 is provided upon its inner surface with an annular rib 6 upon which rests a rigid grid 7 supporting a container 8 for the catalytic material. The container 8 is constructed of a group of spaced parallel plates rigidly joined together to provide a structure which will not warp under the high temperature conditions within the catalytic chamber. The catalytic material is packed uniformly between the plates which hold it in position and prevent displacement. Immediately above and resting upon the container 8 is placed a container 9 of similar construction having carded asbestos or other filtering material between the plates thereof. The provision of a filter immediately preceding the catalytic material thoroughly protects it from contamination with dust and other impurities suspended in and carried along by the gases. It becomes necessary to replace this filter periodically as it becomes clogged, and to enable this to be done in a minimum of time both the container 9 for the filtering material and the container 8 for the catalyst are designed as unitary removable structures which may be quickly lifted out and replaced by duplicate units. These containers may be removed from the converter A, where contamination occurs most frequently, by merely removing the top 4 and lifting them out. Similarly, container 8 may be removed from converter B, for example, by first removing converter A and gas distributing section E, and then lifting it out.

The converter B is of similar construction to converter A except that the container 8 for the catalyst is constructed of a greater number of plates to thereby provide a larger amount of catalytic material, and an outlet 10 is provided below the contained catalytic material. I do not find it necessary to provide a filter unit in any but the A converter.

Intermediate the converters A and B I have provided a gas distributing section E comprising a tubular casting provided with the inlet 11 and outlet 12 and an inclined partition 13 extending diagonally across the section thereby providing separated inlet and outlet gas distributing sections. The three sections A, B, and E are formed as separate castings and consequently are easily removed or replaced. By providing the gas distributing section E of the construction shown I am enabled to materially reduce the height of the converter column.

The gas, following its partial conversion in the converter A, is passed through the outlet 12 and conduit 14 into the heat transferrer $T^2$. The temperature of the gas has been increased considerably during its conversion, due to the exothermic character of the reaction taking place. Accordingly the gases must be again cooled down to a temperature favorable for conversion in its passage through the heat transferrer $T^2$. Following this cooling action the gas leaves the heat transferrer and is passed through the conduit 15 into the distributing section E through the inlet 11, whence it passes downwardly through the catalytic material contained in the converter B where the conversion to sulfur trioxide is further carried toward completion. Following this stage the temperature of the gas must be again lowered, consequently it is passed out through the outlet 10 and conduit 16 into the heat transferrer $T^3$ where the gas is again cooled.

From the transferrer $T^3$ the gas passes through the conduit 17 and inlet 18 into the converter C. The converter C is substantially the same as converter A except that it is again provided with a larger amount of catalytic material than is contained in the converter B. The conversion is here further carried toward completion but as the amount of oxidation of sulfur dioxide taking place at this stage is relatively small as compared with the earlier stages the amount of heat generated is considerably less. I have found that in order to reduce the temperature to that desired in the gases going to the final converter D it is unnecessary to provide a heat interchanger at this point but sufficient lowering in temperature will take place in the conduit 19 connecting the converter C with converter D. Consequently the gases from converter C are passed out through the outlet 22 of distributing section F, through the conduit 19 and back into section F through inlet 21. The gases then pass downwardly through converter D where the oxidation of sulfur dioxide to sulfur trioxide is practically quantitatively completed. Converter D is again provided with a larger amount of catalytic material than is contained in converter C.

The difficulty of converting sulfur dioxide to sulfur trioxide by catalytic oxidation increases as the precentage conversion increases due to the well-known law of mass action. For this reason it becomes necessary to gradually increase the amount of catalytic material in the various stages of the conversion to permit a substantially quantitative yield being obtained.

Following the final conversion stage it becomes necessary to pass the gases to an absorption system in which the contained sulfur trioxide is absorbed in concentrated sulfuric acid. It is desirable to maintain the temperature of the gases going to the absorber as low as practicable. To accomplish this the gases are passed from the converter D through the outlet 23 and conduit 24 into the heat transferrer T⁴, where their temperature is lowered to about 200-225° C. Following this cooling step the gases are passed through the conduit 25 to the absorption system.

The heat transferrers T¹, T², T³ and T⁴, are preferably horizontal tube coolers as shown in Fig. II. An outer shell 26 is provided with removable heads 27. The gases to be cooled are passed into and out of the apparatus through the inlet 28 and outlet 29 respectively. A tube sheet is provided in each end of the shell 26 forming distributing sections 32. Into the tube sheet 31 are inserted tubes 33 through which the gases to be cooled pass. These tubes are rolled into the tube sheets, as is well known, and are removed by cutting them out similarly to the removal of tubes from a boiler. This can only be done conveniently when the tubes are horizontal, and moreover, it becomes much easier to clean the tubes when they are in this position. The cooling medium is introduced and removed through the inlet 34 and outlet 35 respectively. I find it preferable to insert baffles 36 within the heat transferrers to cause the cooling medium to thoroughly come in contact with the cooling surfaces. I have discovered that by placing the heat transferrers in a horizontal position rather than vertical, the tendency of the gases passing through the tubes to form a core is avoided, resulting in considerably increased heat transfer efficiency.

It is necessary to closely control the operation of cooling gases containing sulfur trioxide in order that condensation of corrosive sulfuric acid, due to local cooling of the heat transfer surfaces below the condensation temperature of sulfuric acid corresponding to the moisture content of the gases, will not take place. It will be appreciated that a certain amount of moisture is present in the gases which will combine with sulfur trioxide and condense out as sulfuric acid if temperature conditions are not properly controlled. To eliminate the possibility of condensation of acid in the heat transferrers I prefer to employ as the cooling medium air which has been preheated to a temperature which will not cause the condensation of acid, and to accomplish this purpose I employ the circulation system shown in Fig. I.

Air is drawn into the system through the conduit 38 by the blower 39 and is forced through the conduits 41, 42, 43, 44 and 45 into the respective heat transferrers T¹, T², T³, T⁴. Following the cooling action, the now heated air passes through the conduits 46, 47, 48 and 49 into the discharge conduit 51. Conduit 52 is provided connecting discharge conduit 51 with inlet conduit 38. A valve 53 is placed in conduit 52, and a valve 54 in discharge conduit 51 following the point at which conduit 53 intersects same. By properly regulating valves 53 and 54 I am able to pass a portion of the heated air from discharge conduit 51 into the inlet conduit 38 whereby the temperature of the entering cooling air may be raised and controlled to give an initial cooling temperature in the heat transferrers which will not result in condensation of sulfuric acid. It will also be clear that suitable valves are provided in the various conduits whereby the flow of gases may be regulated.

It will be seen that in the system which I have provided, the heat transferrers are placed outside of and separated from the converter columns. Moreover, the heat transferrers are placed in a horizontal position with removable ends whereby the interior thereof is readily accessible for cleaning, and repair and replacement of the tubes. The converter system is composed of replaceable units arranged in a plurality of separate columns of comparatively low height. It thus becomes possible to work upon various parts of the system, as for example, in replacing a filter, or if necessary, a catalyst container, or in cleaning and repairing the heat transferrers, with a minimum amount of disturbance of the remainder of the apparatus. By providing two separated converter columns, each constructed of replaceable and interchangeable units, I render it possible to disassemble the columns with a minimum amount of effort and a minimum consumption of time. The height of the apparatus is considerably lessened thus further increasing accessibility of parts, and the floor space required is a minimum compatible with convenience. A system is thus provided in which the cost of acid produced is materially reduced due to lowered maintenance charges and substantial elimination of inactive periods.

I claim:

1. In an apparatus for the conversion of sulfur dioxide to sulfur trioxide by the contact process, the combination of a converter, and a heat transfer unit connected thereto comprising a shell having an inlet and an outlet therein, and a conduit section arranged within said shell between and in series with said inlet and said outlet, said conduit section being in a substantially horizontal position, and said inlet and said outlet being in substantially right-angle relation to said conduit section.

2. An apparatus for the conversion of sulfur dioxide to sulfur trioxide by the contact process comprising a plurality of converter units arranged in a plurality of separate columns and independent horizontal tube heat transfer units connected to said converter units, said converter units in the separate columns being arranged in superposed relation for the passage of gas therethrough in series, said heat transfer units being placed adjacent their respective converter units.

3. Apparatus for the conversion of sulfur dioxide to sulfur trioxide by the contact process comprising a pair of converter units arranged in a pair of separate columns, independent horizontal tube heat transfer units connected to said converter units, said converter units in the separate columns being arranged in superposed relation for the passage of gas therethrough in series, said heat transferrer units being placed adjacent their respective converter unit.

4. Apparatus for the conversion of sulfur dioxide to sulfur trioxide by the contact process comprising a plurality of converter units arranged in a plurality of separate columns, said converter units in the separate columns being arranged in superposed relation, an independent heat transfer unit associated with and placed adjacent each converter unit thereby forming a plurality of converter-heat transfer unit combinations, said converters and heat transfer units being so arranged as to cause the reacting gases to pass through said combinations in series.

5. Apparatus for the conversion of sulfur dioxide to sulfur trioxide by the contact process comprising a pair of converter units arranged in a pair of separate columns, said converter units in the separate columns being arranged in superposed relation, an independent heat transfer unit associated with and placed adjacent each converter unit thereby forming a plurality of converter-heat transfer unit combinations, said converters and heat transfer units being so arranged as to cause the reacting gases to pass through said combinations in series.

6. Apparatus for the conversion of sulfur dioxide to sulfur trioxide by the contact process comprising a plurality of converter units arranged in a plurality of separate columns, said converter units in the separate columns being arranged in superposed relation, an independent substantially elongated heat transfer unit associated with each converter unit, said heat transfer units being disposed adjacent a converter unit and arranged with their longer axes substantially horizontal, thereby forming a plurality of converter-heat transfer unit combinations, said converters and heat transfer units being so arranged as to cause the reacting gases to pass through said combinations in series.

7. Apparatus for the conversion of sulfur dioxide to sulfur trioxide by the contact process comprising a pair of converter units arranged in a pair of separate columns, said converter units in the separate columns being arranged in superposed relation, an independent substantially elongated heat transfer unit associated with each converter unit, said heat transfer units being disposed adjacent a converter unit and arranged with their longer axes substantially horizontal, thereby forming a plurality of converter-heat transfer unit combinations, said converters and heat transfer units being so arranged as to cause the reacting gases to pass through said combinations in series.

In testimony whereof, I affix my signature.

HANS O. C. ISENBERG.